Aug. 13, 1957  C. A. STOECKEL ET AL  2,802,513
METHOD OF MAKING STRAIN-FREE GASKETS
Filed Dec. 6, 1955
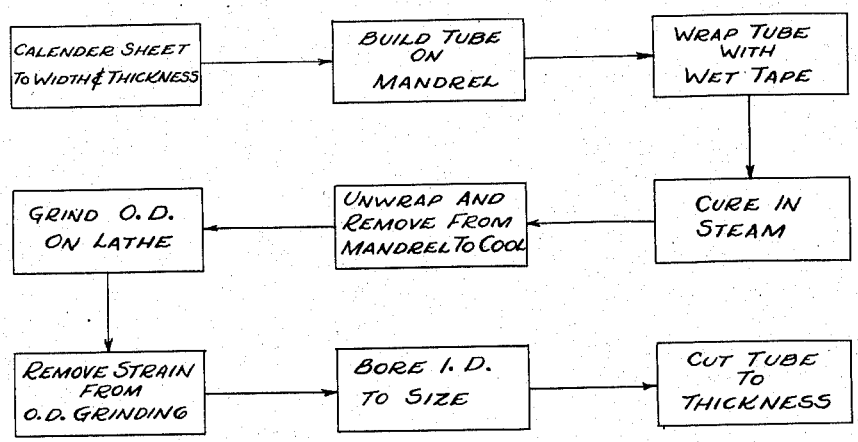
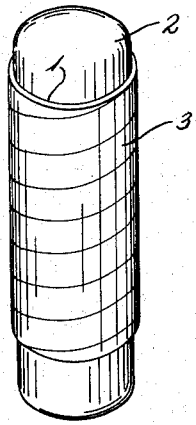
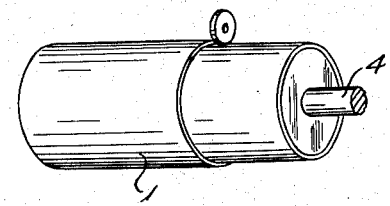
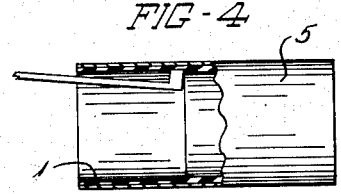
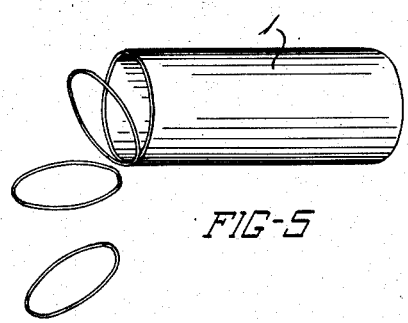
INVENTORS
CHESTER A. STOECKEL
CHARLES E. MUDD
BY
W. A. Fraser
ATTY.

2,802,513
METHOD OF MAKING STRAIN-FREE GASKETS

Chester A. Stoeckel, Little Compton, and Charles E. Mudd, West Barrington, R. I., assignors to The Firestone Tire & Rubber Company, Akron, Ohio, a corporation of Ohio Application December 6, 1955, Serial No. 551,409

10 Claims. (Cl. 154—33.1)

The present invention relates to improved means for making gaskets and more particularly to an improved method of making a strain-free rubber gasket.

A rubber gasket is conventionally used to provide a seal between an oil filter housing and the engine block or housing cap which ever the case may be. Difficulty is experienced in maintaining an adequate seal in such a location where the lubricating oil is heated because strains introduced into the gasket during manufacture are relieved by heat during use with the result that the gasket changes shape and permits leakage of oil.

The present invention overcomes the disadvantages of the conventional gasket by providing means for accurately cutting the inside and outside peripheral edges without placing the gasket under strain.

It is therefore an object of the invention to provide means for accurately cutting a thin rubbery body to desired contour without placing significant strain in the body; to provide a method of accurately cutting a strain-free gasket; to provide means for accurately cutting the inside diameter of a rubber tube while holding it firmly but lightly in a cylindrical sleeve; and to manufacture a strain-free gasket to very close dimensional tolerances. These and other objects of the invention will be more readily understood by reference to the following specification, claims and the drawing of which:

Figure 1 is a chart showing the steps of the invention;
Figure 2 is a perspective view of a rubber tube mounted on a mandrel for vulcanization;
Figure 3 is a schematic perspective view showing the cutting of the outside diameter of the sleeve;
Figure 4 is a schematic view in perspective showing the cutting of the inside diameter of the sleeve; and
Figure 5 is a schematic view in perspective showing slicing of the rubber tube into gaskets.

The method of the invention may be readily understood by reference to the figures of the drawing. Rubbery material of the desired formulation is mixed and calendered into a sheet of proper width and thickness and built into the shape of a tube 1 on a mandrel 2. (Fig. 2). The tube 1 is wrapped tightly with wet tape 3 and vulcanized in an autoclave in open steam. After vulcanization, the tape 3 is removed and the tube taken from the mandrel and allowed to cool so that all internal strain is removed.

Conventional procedure at this point has been to cool the tube on the mandrel where internal strains are set up in the tube. These strains relieve themselves over a period of time causing the gaskets to change dimension and warp out of tolerance and allow the escape of oil.

The cooled tube is mounted on a chuck 4 (Fig. 3) of a lathe, ground down to the proper outside diameter, removed from the chuck and allowed to rest until all strain from the grinding operation has been relieved. Next tube 1 is mounted in a sleeve 5 (Fig. 4) having an inside diameter identical with the outside diameter of the tube 1 and again placed on the lathe where the inside diameter is bored to the proper size. The tube 1 is now removed from the sleeve 5 and placed in a conventional gasket cutting machine where it is cut transversely into individual gaskets. The steps of the invention may be easily traced by reference to the charts of Figure 1.

The gaskets made by the present invention may be held to tolerances of ±.0025 inch and will maintain this tolerance over the life of the gasket whereas prior art gaskets having a satisfactory tolerance after manufacture lose that tolerance by distortion and warping in a few months. Those skilled in the art will recognize a tolerance of ±.0025 inch as being very difficult to hold, even on a molded part.

Rubbery compositions satisfactory for use in the invention include compositions containing rubbery chlorobutadiene, butadiene-acrylonitrile copolymers and other oil resistant rubbery natural and synthetic polymeric materials as well as blends of those materials with oil resistant plastics and resins. The composition may be compounded with modifying ingredients such as sulfur and accelerators for vulcanization, loading materials such as textile fibers, carbon black, clay, metal oxides and other organic and inorganic fillers, antioxidants, softeners and tactifiers as well as other ingredients. One compound suitable for the invention is as follows, all parts being based on 100 parts of rubber hydrocarbon by weight:

| | |
|---|---:|
| Chloroprene polymer | 100.00 |
| Nylon flock | 35.00 |
| Light calcine magnesium oxide | 4.00 |
| Zinc oxide | 10.00 |
| Carbon black | 110.00 |
| Tactifier | 10.00 |
| Plasticizer | 10.00 |
| Accelerator NA–22 [1] | 1.00 |
| | 276.00 |

[1] An imidozoline sold by E. I. du Pont de Nemours & Co., Wilmington, Delaware.

A stock of the above formulation was mixed on a conventional open two roll mill and sheeted to a thickness of .060 inch and a width of 28 inches on a calender with an even roll speed. A vulcanized tube having an outside diameter of 4³¹⁄₃₂ inches was fabricated from this sheet by wrapping the sheet around a mandrel, wrapping the outside surface with wet cloth tape, and vulcanizing it in an autoclave in open steam at a temperature of 306° F. for 45 minutes. The tube and mandrel were removed from the autoclave and the tube stripped from the mandrel and allowed to cool 24 hours under no stress to eliminate internal strain. The cooled tube was mounted on the chuck of a grinding lathe and the outside diameter ground down to 4.755 inches. The tube was removed from the chuck and allowed to rest 12 hours to relieve all internal strain after which it was mounted in a sleeve having the same inside diameter as the outside diameter of the tube. The sleeve and tube were again mounted on the lathe and the tube bored to an inside diameter of 4.335 with a conventional steel boring tool. The tube was removed from the sleeve, mounted in a gasket cutter and slit into gaskets having a thickness of 0.073 inch. When measured, it was found that the gaskets were within ±.0025 inch of the specified size. The gaskets were laid in an atmosphere having an ambient temperature of 80° F. for two months and again measured. Inside and outside diameters as well as thickness were still within a tolerance of ±.0025 inch. This fact indicated that the novel method had produced gaskets free from internal strain.

While certain structures, methods and compositions have been set forth by way of example, it will be obvious to those skilled in the art that modification may be made within the scope of the invention as defined by the following claims:

What is claimed is:

1. A method of making an endless contoured member of vulcanized strain-free rubber comprising the steps of vulcanizing a hollow rubbery member on a mandrel having an outside peripheral surface of less circumferential extent than the circumferential extent of the inner peripheral surface of the endless member, said hollow member having an outer peripheral surface of greater circumferential extent than the circumferential extent of the outer peripheral edge of said endless member, removing said hollow member from the mandrel and allowing it to cool to remove any internal strain, cutting the outer peripheral surface to the exact contour of the endless member, allowing the hollow member to rest to relieve internal strain, and cutting the inner peripheral surface to the contour of said endless member.

2. A method of making an endless strain-free gasket of vulcanized rubbery polymeric material comprising the steps of forming a sheet of said unvulcanized vulcanizable rubbery material having a thickness greater than the thickness of said gasket, wrapping said sheet around a mandrel having an outside diameter of less extent than the inside diameter of the gasket to form a cylinder, said cylinder having an outside diameter greater than the outside diameter of the gasket, vulcanizing said cylinder, removing said cylinder from the mandrel and allowing it to cool to remove internal strain, reducing the outer diameter of the cylinder to the desired outer diameter of the gasket, allowing the cylinder to rest to relieve internal strain, increasing the inner diameter of the cylinder to the desired inner diameter of the gasket, and slicing said cylinder in planes transverse to the axis thereof and spaced apart distances equal to the desired thickness of the gasket.

3. A method of making an endless strain-free gasket of vulcanized rubbery polymeric material comprising the steps of forming a sheet of said unvulcanized vulcanizable rubber material having a thickness greater than the thickness of said gasket, wrapping said sheet around a mandrel having an outside diameter of less extent than the inside diameter of the endless gasket to form a cylinder, vulcanizing said cylinder, removing said cylinder from the mandrel and allowing it to cool to remove internal strain, reducing the outer diameter of the cylinder to the desired outer diameter of the gasket, allowing the cylinder to rest to relieve internal strain, increasing the inner diameter of the cylinder to the desired inner diameter of the gasket, allowing the cylinder to rest to relieve internal strain, and slicing said cylinder in planes transverse to the axis thereof and spaced apart distances equal to the desired thickness of the gasket.

4. A method of making an endless strain-free gasket of vulcanized rubbery polymeric material comprising the steps of forming a sheet of said unvulcanized vulcanizable rubber material having a thickness greater than the thickness of said gasket, wrapping said sheet around a mandrel having an outside diameter of less extent than the inside diameter of the endless gasket to form a cylinder, said cylinder having an outside diameter greater than the outside diameter of the gasket, vulcanizing said cylinder, removing siad cylinder from the mandrel and allowing it to cool and remove internal strain, peeling rubber from the outer surface of the cylinder to reduce the outer diameter to the desired outer diameter of the gasket, allowing the cylinder to rest to relieve internal strain, peeling rubber from the inner surface of the cylinder to increase the inner diameter thereof to the desired inner diameter of the gasket, allowing the cylinder to rest to relieve internal strain, and slicing said cylinder in planes transverse to the axis thereof and spaced apart distances equal to the desired thickness of the gasket.

5. A method of making an endless strain-free gasket of vulcanized rubbery polymeric material comprising the steps of forming a sheet of said unvulcanized vulcanizable rubber material having a thickness greater than the thickness of said gasket, wrapping said sheet around a mandrel having an outside diameter of less extent than the inside diameter of the endless gasket to form a cylinder, said cylinder having an outside diameter greater than the outside diameter of the gasket, vulcanizing said cylinder, removing said cylinder from the mandrel and allowing it to cool to remove internal strain, grinding the outer surface of the cylinder to reduce the outer diameter to the desired outer diameter of the gasket, allowing the cylinder to rest at least 12 hours to relieve internal strain, peeling rubber from the inner surface of the cylinder to increase the inner diameter to the desired inner diameter of the gasket and slicing said cylinder in planes transverse to the axis thereof and spaced apart distances equal to the desired thickness of the gasket.

6. A method of making an endless strain-free gasket of vulcanized rubbery polymeric material comprising the steps of forming a sheet of said unvulcanized vulcanizable rubber material having a thickness greater than the thickness of said gasket, wrapping said sheet around a mandrel having an outside diameter of less extent that the inside diameter of the endless gasket to form a cylinder, said cylinder having an outside diameter greater than the outside diameter of the gasket, vulcanizing said cylinder, removing said cylinder from the mandrel and allowing it to cool at least 24 hours to remove internal strain, grinding the outer surface of the cylinder to reduce the outer diameter of the cylinder to the desired outer diameter of the gasket, allowing the cylinder to rest at least 12 hours to relieve internal strain, increasing the inner diameter of the cylinder to the desired inner diameter of the gasket, allowing the cylinder to rest to relieve internal strain, and slicing said cylinder in planes transverse to the axis thereof and spaced apart distances equal to the desired thickness of the gasket.

7. A method of producing a strain-free gasket of vulcanized rubbery polymeric material having accurately maintained dimensions comprising the steps of molding and vulcanizing a rubber cylinder having an outside diameter equal to the desired outside diameter of said gasket and an inside diameter less than the desired inside diameter of the gasket, allowing the cylinder to rest to relieve all internal strain, inserting said cylinder in a sleeve having an inside diameter no less than the outside diameter of said cylinder, cutting the wall of the cylinder to increase the inside diameter of the cylinder to the desired diameter of the gasket, removing said cylinder from the sleeve and slicing said cylinder in planes transverse the axis thereof, each plane spaced from the other a distance equal to the desired thickness of said gaskets.

8. A method of producing a strain-free gasket of vulcanized rubbery polymeric material having accurately maintained dimensions comprising the steps of molding and vulcanizing a rubber cylinder having an outside diameter equal to the desired outside diameter of said gasket and an inside diameter less than the desired inside diameter of the gasket, allowing the cylinder to rest at least 24 hours to relieve all internal strain, inserting said cylinder in a sleeve having an inside diameter no less than the outside diameter of said cylinder, cutting the wall of the cylinder to increase the inside diameter of the cylinder to the desired diameter of the gasket, removing said cylinder from the sleeve and slicing said cylinder in planes transverse the axis thereof each plane spaced from the other a distance equal to the desired thickness of said gaskets.

9. A method of producing a strain-free gasket of vulcanized rubbery polymeric material having accurately maintained dimensions comprising the steps of molding and vulcanizing a rubber cylinder having an outside diameter equal to the desired outside diameter of said gasket and an inside diameter less than the desired inside diameter of the gasket, allowing the cylinder to rest at least 24 hours to relieve all internal strain, inserting said cylinder in a sleeve having an inside diameter no less than the outside diameter of said cylinder, cutting the wall of the cylinder to increase the inside diameter of the cylinder to the desired diameter of the gasket, removing said cylinder from the sleeve, allowing the cylinder to rest at least 12 hours and slicing said cylinder in planes transverse the axis thereof and each plane spaced from the other a distance equal to the desired thickness of said gaskets.

10. A method of producing a strain-free gasket of vulcanized rubbery polymeric material having accurately maintained dimensions comprising the steps of molding and vulcanizing a rubber cylinder having an outside diameter equal to the desired outside diameter of said gasket and an inside diameter less than the desired inside diameter of the gasket, allowing the cylinder to rest at least 24 hours to relieve all internal strain, inserting said cylinder in a sleeve having an inside diameter no less than the outside diameter of said cylinder, cutting the wall of the cylinder to increase the inside diameter of the cylinder to the desired diameter of the gasket, removing said cylinder from the sleeve, allowing the cylinder to rest to relieve all internal strain and slicing said cylinder in planes transverse the axis thereof and each spaced from the other a distance equal to the desired thickness of said gaskets.

References Cited in the file of this patent

UNITED STATES PATENTS

| | | |
|---|---|---|
| 1,162,384 | Nichols | Nov. 30, 1915 |
| 2,045,452 | Emrick | June 23, 1936 |
| 2,129,257 | Bachmann | Sept. 6, 1938 |
| 2,231,769 | Merrill | Feb. 11, 1941 |

OTHER REFERENCES

"Gottlob's Technology of Rubber" by J. L. Rosenbaum, published by Maclaren & Sons Ltd. 1927, page 230.